(12) United States Patent
Pinarbasi

(10) Patent No.: US 7,038,890 B2
(45) Date of Patent: May 2, 2006

(54) CURRENT PERPENDICULAR TO THE PLANES (CPP) SENSOR WITH A HIGHLY CONDUCTIVE CAP STRUCTURE

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 146 days.

(21) Appl. No.: 10/630,817

(22) Filed: Jul. 29, 2003

(65) Prior Publication Data

US 2005/0024790 A1 Feb. 3, 2005

(51) Int. Cl.
*G11B 5/39* (2006.01)

(52) U.S. Cl. ................................. 360/324.1
(58) Field of Classification Search ............ 360/324.1, 360/320, 319, 322, 313, 110
See application file for complete search history.

(56) References Cited

U.S. PATENT DOCUMENTS 6,153,320 A 11/2000 Parkin ........................ 428/693
6,268,985 B1 7/2001 Pinarbasi ................ 360/324.12
2004/0001976 A1* 1/2004 Saito ..................... 428/694 SC

FOREIGN PATENT DOCUMENTS

JP 2000-228003 A * 8/2000
JP 2003-60262 A * 2/2003

OTHER PUBLICATIONS

"Advanced Spin-Valve GMR Head", *FUJITSI Sci. Tech. J.*, 37, 2, p. 174-182, Dec. 2001, Kanai et al.
"CPP Operational Mode of GMR Head", *FUJITSI Sci. Tech. J.*, 37, 2, p. 192-200, Dec. 2001, Nagasaka et al.
"Spin Valve Read Heads for Magnetic Recording", Carnegie Mellon Materials Science and Engineering Seminar, Sep. 2001, Lee.

* cited by examiner

*Primary Examiner*—Julie Anne Watko
(74) *Attorney, Agent, or Firm*—Ervin F. Johnston

(57) ABSTRACT

A magnetic read head has a current perpendicular to the planes (CPP) sensor with a top cap layer that is ruthenium (Ru) or rhodium (Rh) or a top cap layer structure which includes a first layer of tantulum (Ta) only, a second layer of ruthenium (Ru), rhodium (Rh) or gold (Au) with the first layer being located between a spacer layer and the second layer.

15 Claims, 9 Drawing Sheets

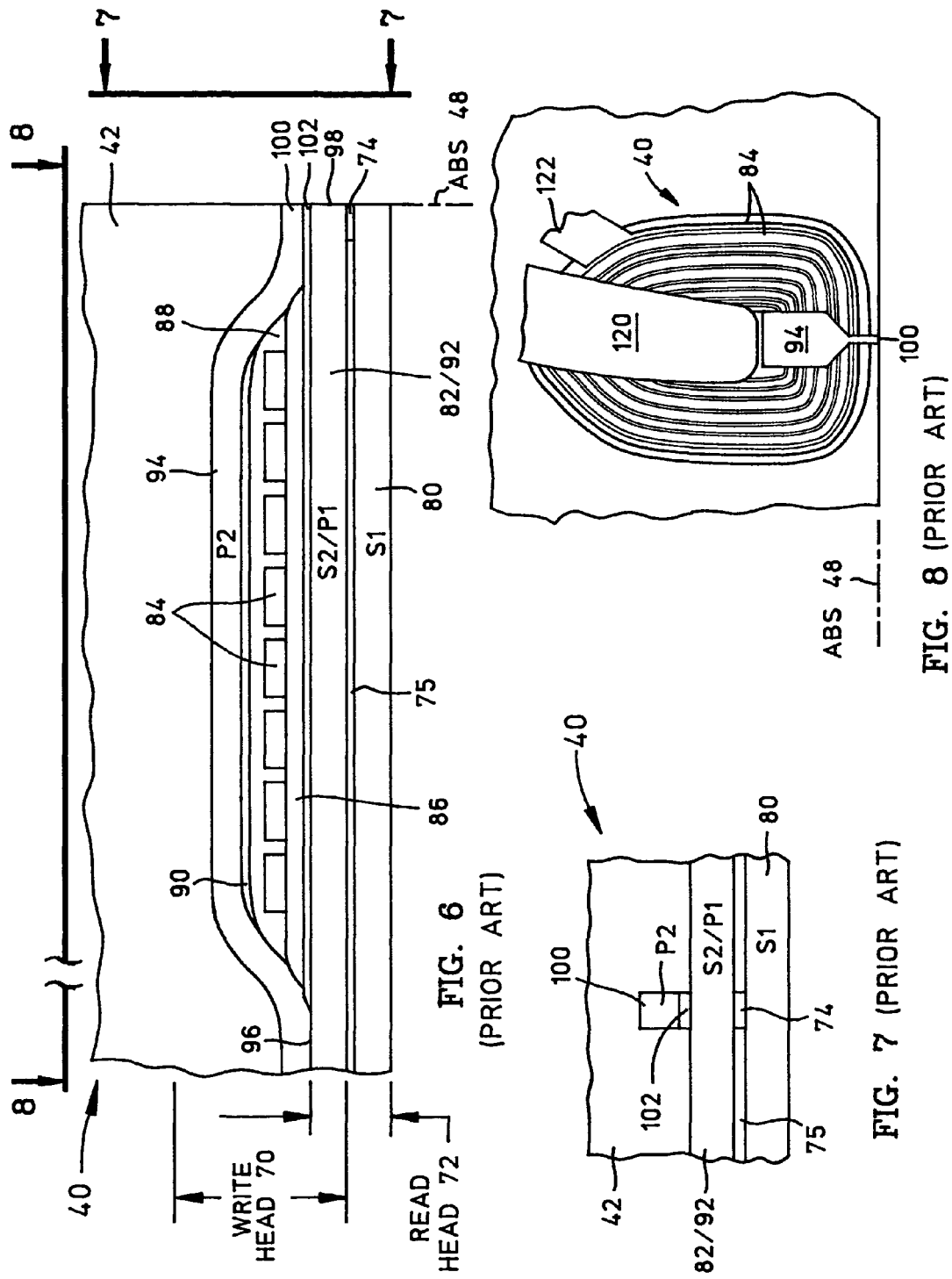

CURRENT PERPENDICULAR TO THE PLANES (CPP) SENSOR WITH A HIGHLY CONDUCTIVE CAP STRUCTURE

BACKGROUND OF THE INVENTION

1. Field of the Invention

The present invention relates to a current perpendicular to the planes (CPP) sensor with a highly conductive cap structure and, more particularly, to such a cap structure which includes ruthenium (Ru), rhodium (Rh) or gold (Au) and a method of making.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. When the disk is not rotating the actuator arm parks the suspension arm and slider on a ramp. When the disk rotates and the slider is positioned by the actuator arm above the disk, air is swirled by the rotating disk adjacent an air bearing surface (ABS) of the slider causing the slider to ride on an air bearing a slight distance from the surface of the rotating disk. The ABS is an exposed surface of the slider and the write and read heads that faces the rotating disk. When the slider rides on the air bearing, the actuator arm positions the write and read heads over the selected circular tracks on the rotating disk where field signals are written and read by the write and read heads. The read and write heads are connected to processing circuitry that operates according to a computer program to implement the writing and reading functions.

An exemplary high performance read head employs a current perpendicular to the planes (CPP) sensor, such as a magnetic tunnel junction (MTJ) sensor, for sensing the magnetic field signals from the rotating magnetic disk. The MTJ sensor includes an insulative tunneling or barrier spacer layer sandwiched between a ferromagnetic pinned layer and a ferromagnetic free layer. An antiferromagnetic pinning layer interfaces the pinned layer for pinning the magnetic moment of the pinned layer 90° to the air bearing surface (ABS). The MTJ sensor is located between ferromagnetic first and second shield layers. First and second leads, which may be the first and second shield layers, are connected to the MTJ sensor for conducting a tunneling current therethrough. The tunneling current is conducted perpendicular to the major film planes (CPP) of the sensor as contrasted to a spin valve sensor where the sense current is conducted parallel to or, otherwise stated, conducted in the planes of the major thin film planes (CIP) of the spin valve sensor. Another type of CPP sensor employs a nonmagnetic conductive material for the spacer layer instead of an insulation material. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is parallel to the ABS, occurs when the tunneling current is conducted through the sensor without magnetic field signals from the rotating magnetic disk.

When the magnetic moments of the pinned and free layers are parallel with respect to one another the resistance of the MTJ sensor to the tunneling current ($I_T$) is at a minimum and when the magnetic moments are antiparallel the resistance of the MTJ sensor to the tunneling current is at a maximum. Changes in resistance of the sensor is a function of cos θ, where θ is the angle between the magnetic moments of the pinned and free layers. When the tunneling current ($I_T$) is conducted through the sensor, resistance changes, due to field signals from the rotating magnetic disk, cause potential changes that are detected and processed as playback signals. The sensitivity of the sensor is quantified as magnetoresistive coefficient dr/R where dr is the change in resistance of the sensor from minimum resistance (magnetic moments of free and pinned layers parallel) to maximum resistance (magnetic moments of the free and pinned layers antiparallel) and R is the resistance of the MTJ sensor at minimum resistance. The dr/R of a MTJ sensor can be on the order of 40% as compared to 15% for a spin valve sensor.

MTJ sensors are classified as either a top sensor or a bottom sensor. In a bottom sensor the pinning layer is closer to the first shield layer than the second shield layer and in a top sensor the pinning layer is closer to the second shield layer than to the first shield layer. In either type of sensor the first and second shield layers may engage the bottom and the top respectively of the sensor so that the first and second shield layers serve as leads for conducting the tunneling current through the sensor perpendicular to the major planes of the layers of the sensor. The sensor has first and second side surfaces which are normal to the ABS. First and second hard bias layers are adjacent the first and second side surfaces respectively for longitudinally biasing the free layer in a single domain state. This longitudinal biasing also maintains the magnetic moment of the free layer parallel to the ABS when the read head is in the quiescent condition.

In CIP devices, it is desired that a maximum amount of the current flow in the free and pinned layers interfacing the spacer layer and that current shunting through seed layers and capping layers of the sensor be minimized or eliminated. In MTJ devices, however, these layers need to be very conductive for maximum efficiency. Because the sense current in MTJ devices flows perpendicular to the thin film planes the conductance of the bottom and top layers of the sense layer is critical for optimum and reliable operation of these devices. In today's MTJ devices tantalum is used as a capping layer as well as a lead layer which is a source of concern for high resistivity and process complexity. Because of a high affinity to oxygen, the tantalum layer will always be a concern for reliable performance. During atmosphere exposure, the tantalum layer oxidizes and resistivity increases by many orders of magnitude. This oxidized layer must be milled away to ensure good electrical conductance. The milling process is not precise and variation in the amount of milled material deteriorates the gap control. For future MTJ devices this can be critical for accurate control of the read gap.

SUMMARY OF THE INVENTION

The present invention provides a CPP sensor, such as a MTJ sensor, which has a cap layer structure composed of ruthenium (Ru), rhodium (Rh) or gold (Au). The present invention obviates tantalum oxide (TaO) which has a resistance to a tunneling or sense current conducted perpendicular to the planes of the sensor. In one aspect of the invention the cap layer structure is ruthenium (Ru) or rhodium (Rh) and in another aspect of the invention the cap layer structure is composed of a first layer of only tantalum (Ta) and a second layer thereon of ruthenium (Ru), rhodium (Rh) or gold (Au). In another aspect of the invention the first and second layer cap structure may be made by a method wherein the first layer of tantalum (Ta) is sputter deposited in a sputtering chamber with a vacuum followed by sputtering the second layer on the first layer of ruthenium (Ru), rhodium (Rh) or gold (Au) without breaking the vacuum in the sputtering chamber.

Other aspects of the invention will be appreciated upon reading the following description taken together with the accompanying drawings wherein the various figures are not to scale with respect to one another nor are they to scale with the respect to the structure depicted therein.

BRIEF DESCRIPTION OF THE DRAWINGS

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

DESCRIPTION OF THE PREFERRED EMBODIMENTS

Magnetic Disk Drive

Figure 1:
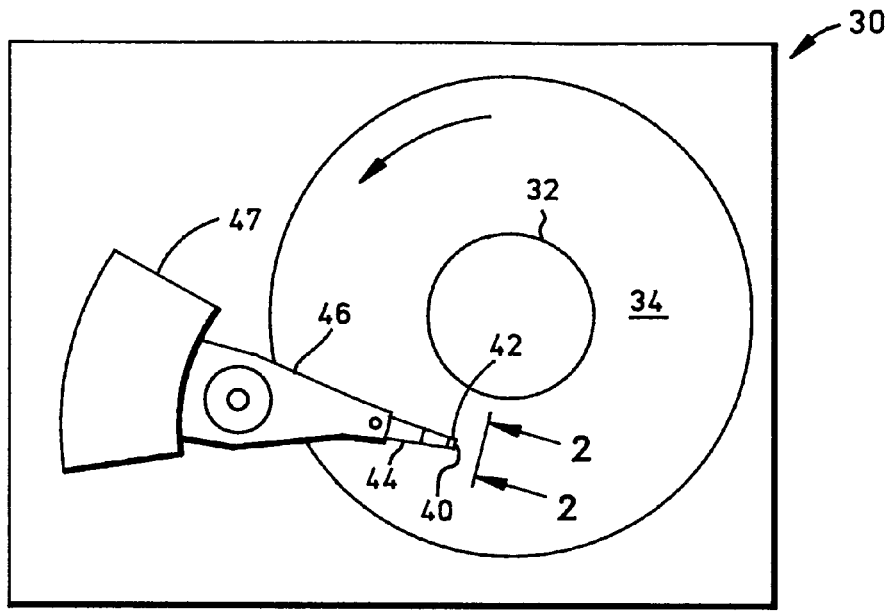
FIG. 1 is a plan view of an exemplary magnetic disk drive.
Figure 2:
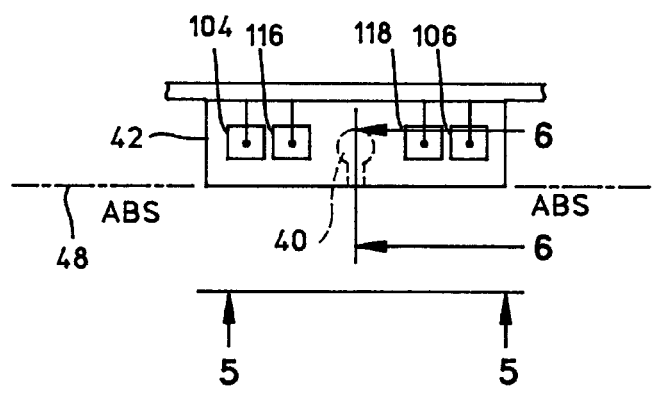
FIG. 2 is an end view of a slider with a magnetic head of the disk drive as seen in plane 2—2 of FIG. 1.
Figure 3:
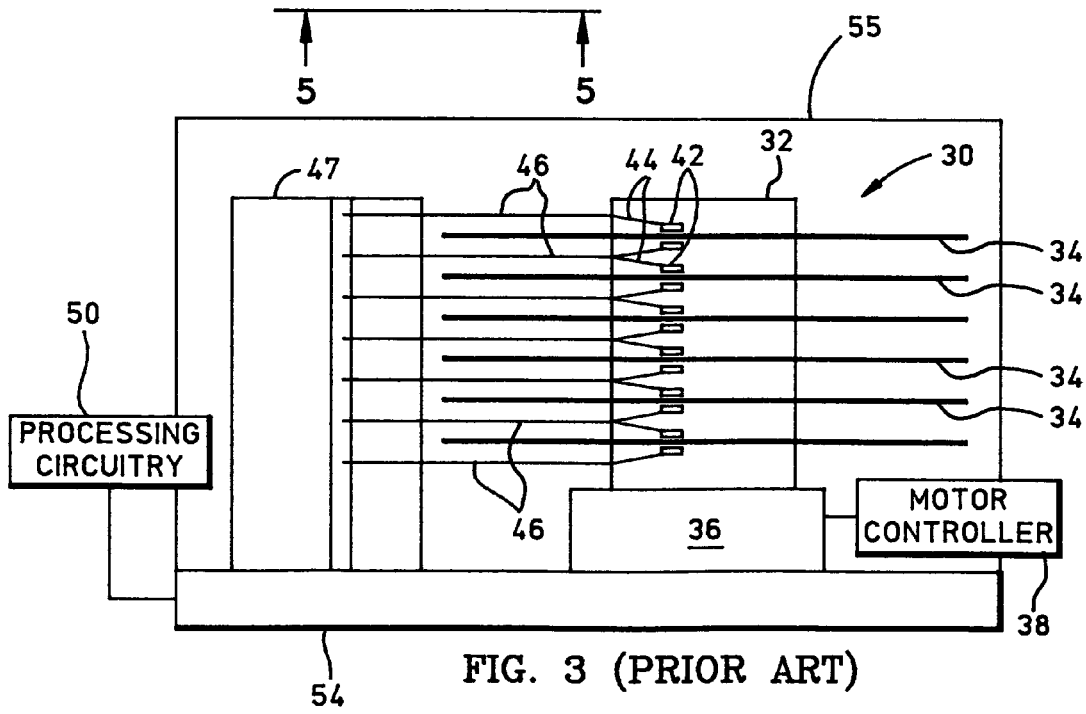
FIG. 3 is an elevation view of the magnetic disk drive wherein multiple disks and magnetic heads are employed.
Figure 4:
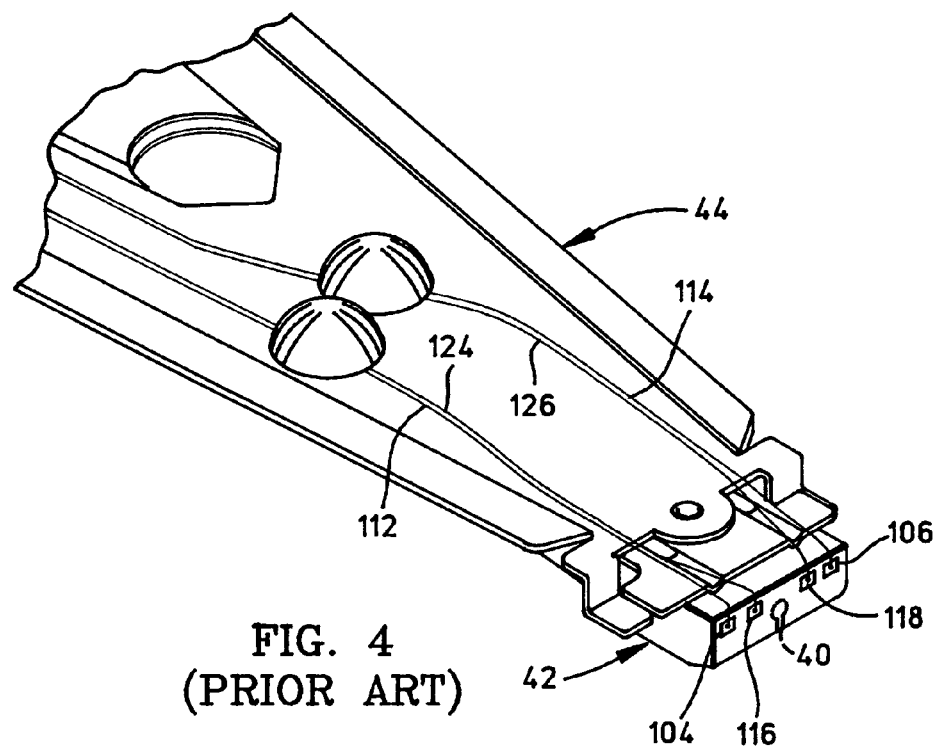
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates one or more magnetic disks 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
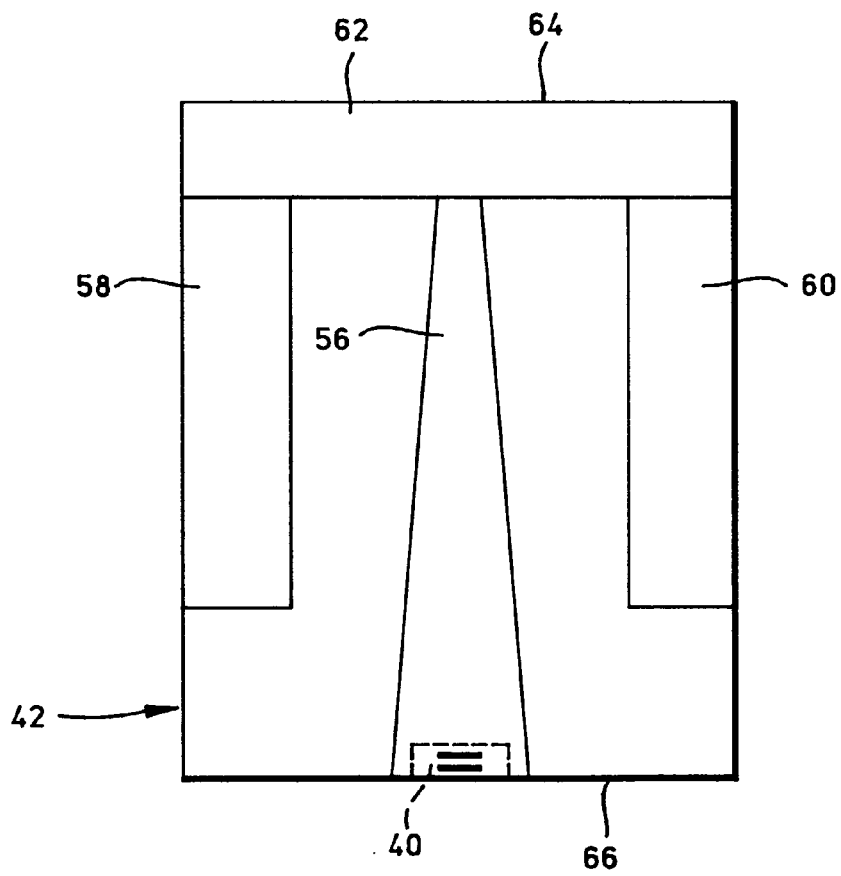
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a current perpendicular to the planes (CPP) sensor of the present invention, such as a magnetic tunnel junction (MTJ) sensor 74. FIG. 7 is an ABS view of FIG. 6. The sensor 74 is sandwiched between ferromagnetic first and second shield layers 80 and 82. In response to external magnetic fields, the resistance of the sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) is conducted through the sensor 74 perpendicular to the planes of its major film surfaces by the first and second shield layers 80 and 82 which serve as first and second leads.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. In a piggyback head (not shown) the second shield layer 82 and the first pole piece layer 92 are separate layers and an insulation layer is located therebetween. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
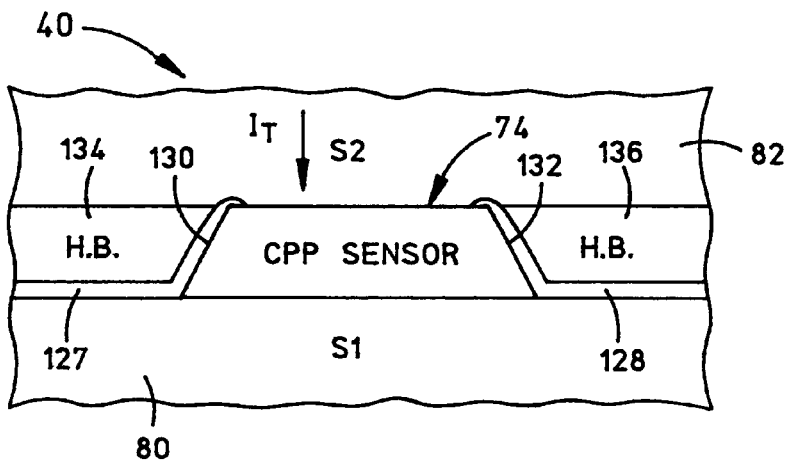
FIG. 9 is an enlarged ABS illustration of the read head with a CPP sensor.

FIG. 9 is an enlarged isometric ABS illustration of the read head 40 shown in FIG. 7. The read head 40 includes the CPP sensor 74. First and second insulation layers 127 and 128, such as alumina ($Al_2O_3$), cover the first shield layer 80 on each side of the sensor 74 as well as slightly covering first and second side walls 130 and 132 of the sensor. First and second hard bias layers 134 and 136 are on the insulation layers 127 and 128 and are adjacent the side walls 130 and 132. The hard bias layers 134 and 136 cause magnetic fields to extend longitudinally through the sensor 74 for stabilizing the sensor. The sensor 74 and the first and second hard bias layers 134 and 136 are located between ferromagnetic first and second shield layers 80 and 82 which may serve as leads for conducting the tunneling current $I_T$ through the sensor 74.

Figure 10:
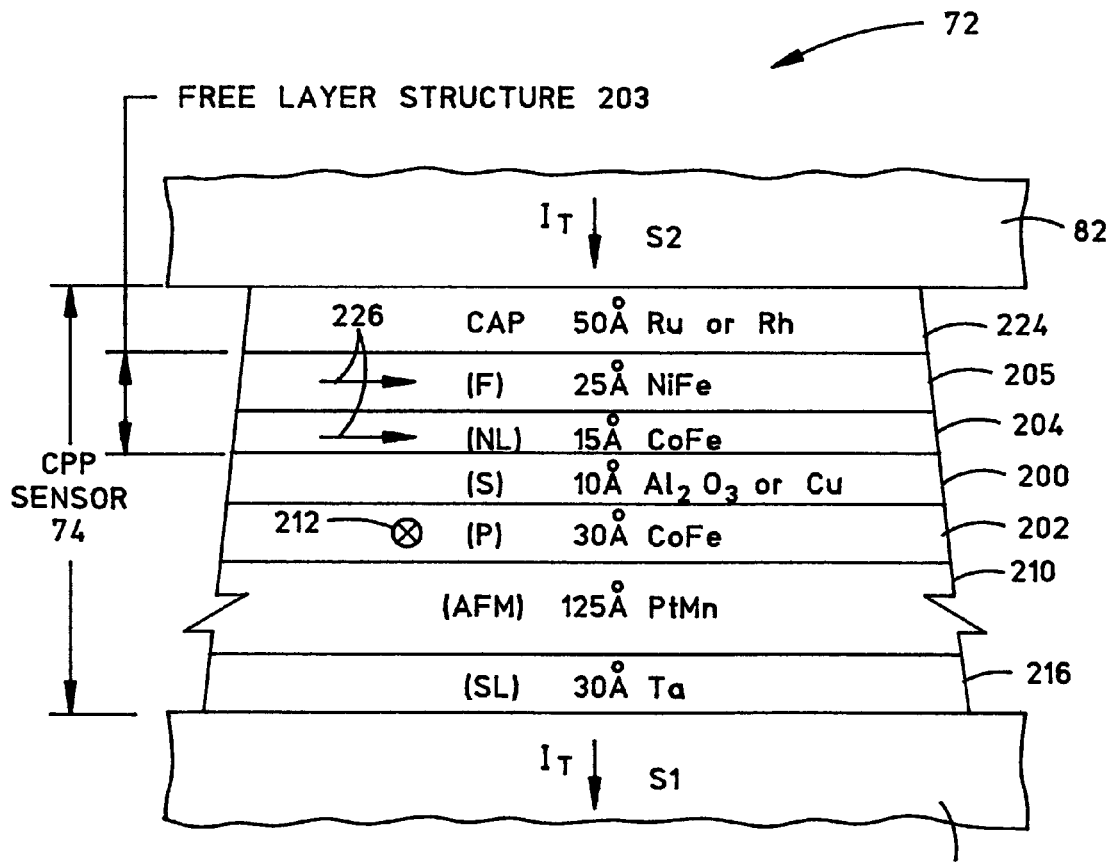
FIG. 10 is an enlarged ABS illustration of the read head with a bottom CPP sensor which has a first embodiment of the cap layer structure.

FIG. 10 is an enlarged ABS illustration of one embodiment of the present CPP sensor 74 which is located between the first and second shield layers 80 and 82. The sensor 74, which is a bottom sensor, includes a spacer layer (S) 200, such as an oxide barrier layer of $Al_2O_3$ or a nonmagnetic conductive layer of Cu, which is located between a pinned layer (P) 202 and a free layer structure 203. When the spacer layer is an oxide barrier layer the sensor is a MTJ sensor. The pinned layer 202 is preferably cobalt iron ($Co_{50}Fe_{50}$) which has a high magnetostriction so that after lapping the head the pinned layer 202 has a stress-induced anisotropy perpendicular to the ABS which supports an exchange coupling between a pinning layer 210 and the pinned layer 202. The pinning layer 210 pins a magnetic moment 212 of the pinned layer perpendicular to the ABS optionally out of the head or into the head as shown in FIG. 10. A seed layer (SL) of tantalum (Ta) 216 may be located between the pinning layer 210 and the first shield layer 80 for improving the microstructure of the layers of the sensor deposited thereon. The free layer structure 203 may include a nanolayer (NL) 204 of cobalt iron (CoFe) and a free layer (F) 205 of nickel iron (NiFe). A first embodiment of a cap layer structure 224, which will be discussed in more detail hereinbelow, is located on the free layer structure 203 for protecting the free layer structure from subsequent processing steps.

The free layer structure 203 has a magnetic moment 226 which is directed optionally from right to left or from left to right, as shown in FIG. 10. When a field signal from the rotating magnetic disk rotates the magnetic moment 226 of the free layer structure into the head the magnetic moments 226 and 212 become more parallel which reduces the resistance of the sensor to the tunneling current ($I_T$) and when the field signal rotates the magnetic moment 226 out of the head the magnetic moments 226 and 212 become more antiparallel which increases the resistance of the sensor to the tunneling current ($I_T$). These resistance changes are processed as playback signals by the processing circuitry 50 in FIG. 3.

Exemplary thicknesses of the layers are 30 Å of tantalum (Ta) for the seed layer 216, 150 Å of platinum manganese ($Pt_{50}Mn_{50}$) for the pinning layer 210, 30 Å of cobalt iron ($Co_{50}Fe_{50}$) for the layer 202, 10 Å of aluminum oxide ($Al_2O_3$) or copper (Cu) for the spacer layer 200, 15 Å of cobalt iron ($Co_{90}Fe_{10}$) for the nanolayer 204 and 25 Å of nickel iron ($Ni_{83}Fe_{17}$) for the free layer 205.

The cap layer structure 224 is ruthenium (Ru) or rhodium (Rh) and may be 50 Å thick in order to protect the top surface of the layer 205 from subsequent processing steps. In this embodiment of the invention the prior art tantalum (Ta) cap layer with a top tantalum oxide (TaO) film has been obviated. The absence of tantalum oxide (TaO) reduces the resistance of the sensor to the tunneling current $I_T$. The thickness of the ruthenium (Ru) or rhodium (Rh) cap layer 224 may be in a range from 10 Å to 200 Å.

Figure 11:
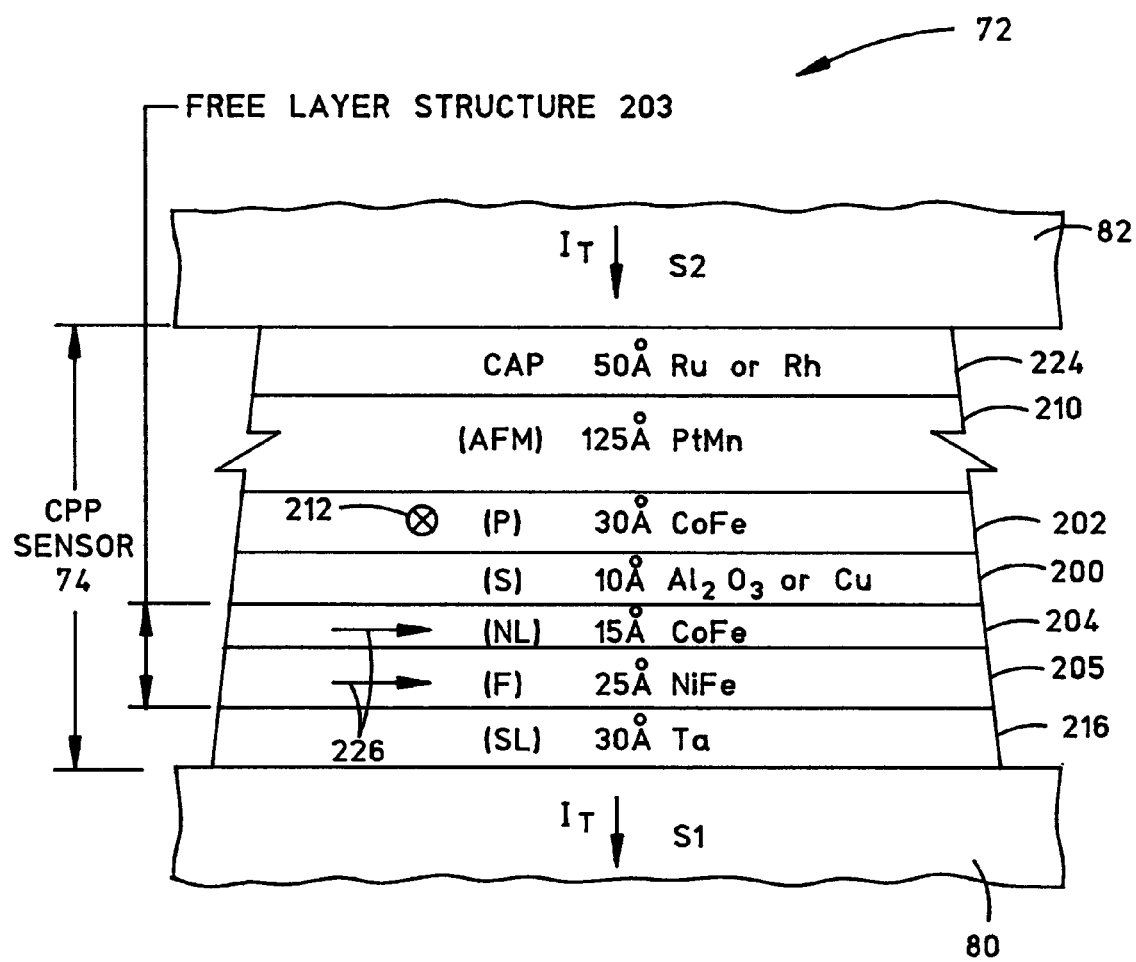
FIG. 11 is an enlarged ABS illustration of the read head with a top CPP sensor which has the first embodiment of the cap layer structure.

The CPP sensor 74 in FIG. 11 is the same as the sensor 74 in FIG. 10 except the layers 210, 202, 200, 204 and 205 have been inverted. The sensor 74 in FIG. 11 is referred to in the art as a top sensor whereas the sensor in FIG. 10 is referred to as a bottom sensor. The cap layer structure 224 in FIG. 11 may be the same as the cap layer structure 224 in FIG. 10.

Figure 12:
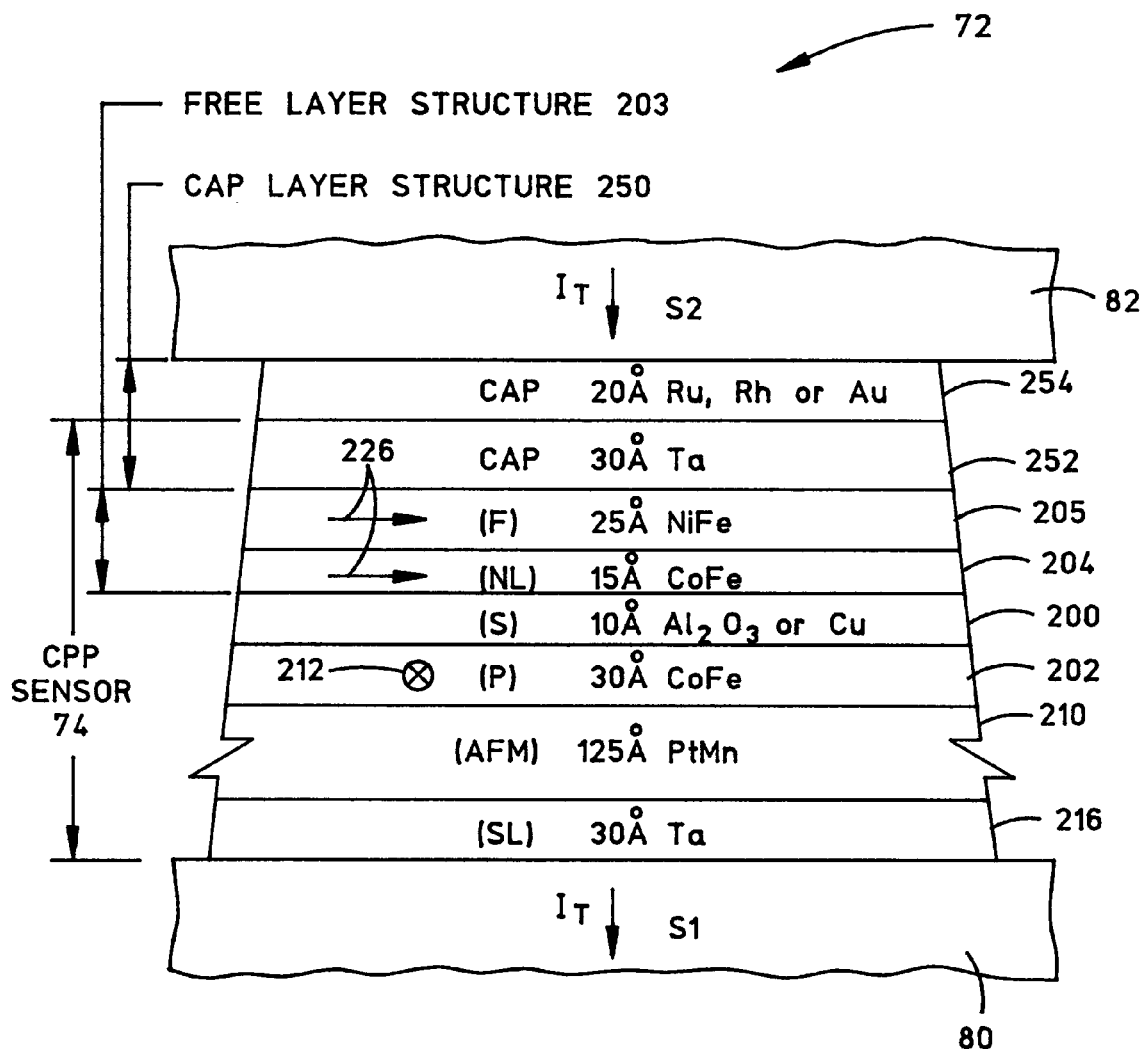
FIG. 12 is the same as FIG. 10 except a second embodiment of the cap layer structure is illustrated.

The read head 72 in FIG. 12 is the same as the read head 72 in FIG. 10 except for the cap layer structure 250. The cap layer structure 250 includes a first layer of only tantalum (Ta) 252 on the free layer 205 and a second layer of ruthenium (Ru), rhodium (Rh) or gold (Au) 254 on the first layer 252. It should be noted that the layer 252 is only tantalum (Ta) and does not have a tantalum oxide (TaO) film thereon. A method of fabricating these layers will be discussed in more detail hereinafter with reference to FIGS. 14 and 15. The exemplary thickness of the layer 252 is 30 Å and the thickness of the second layer 254 should be at least 20 Å.

Figure 13:
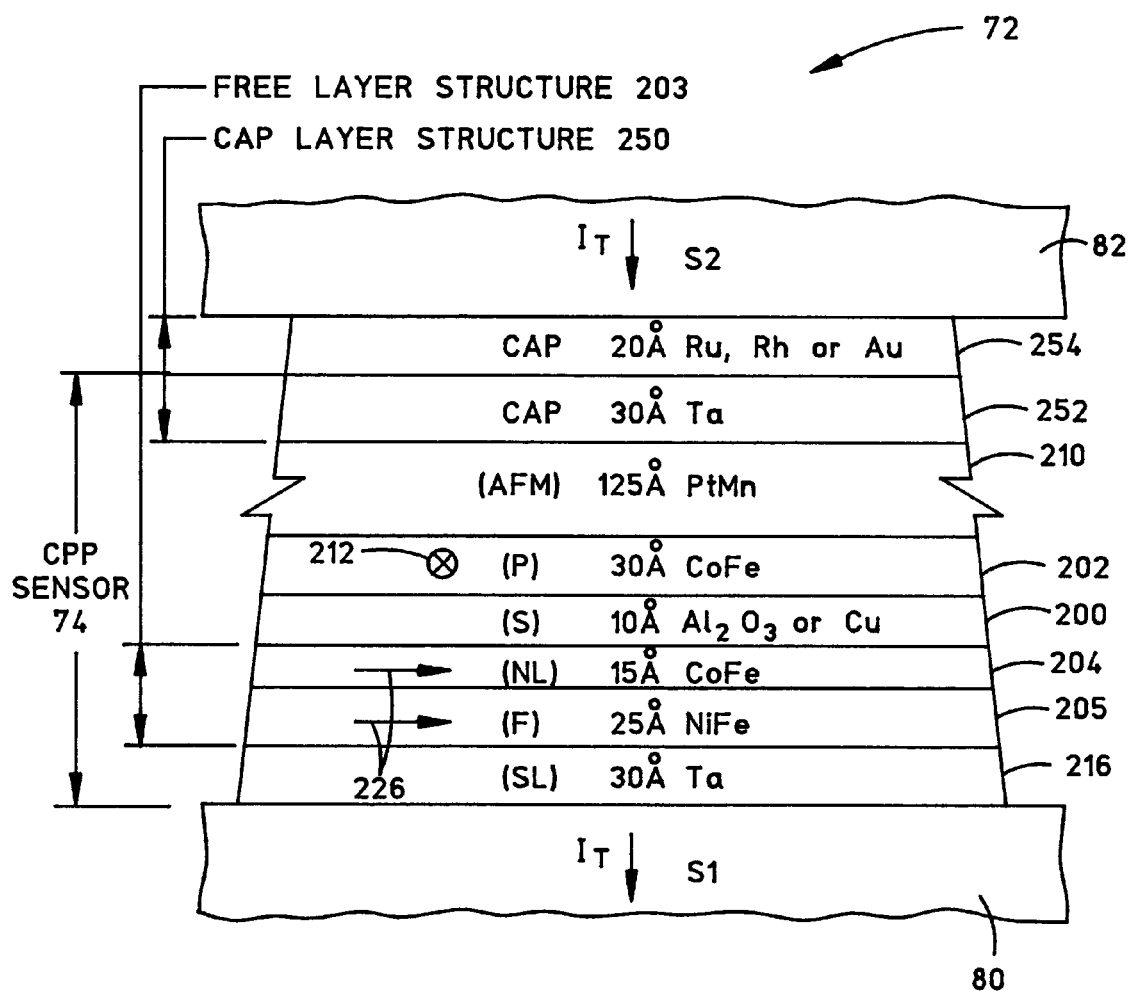
FIG. 13 is the same as FIG. 11 except the second embodiment of the cap layer structure is illustrated.

The CPP sensor 74 in FIG. 13 is the same as the CPP sensor in FIG. 11 except for the cap layer structure 250 described in detail hereinabove.

Method of Making

Figure 14:
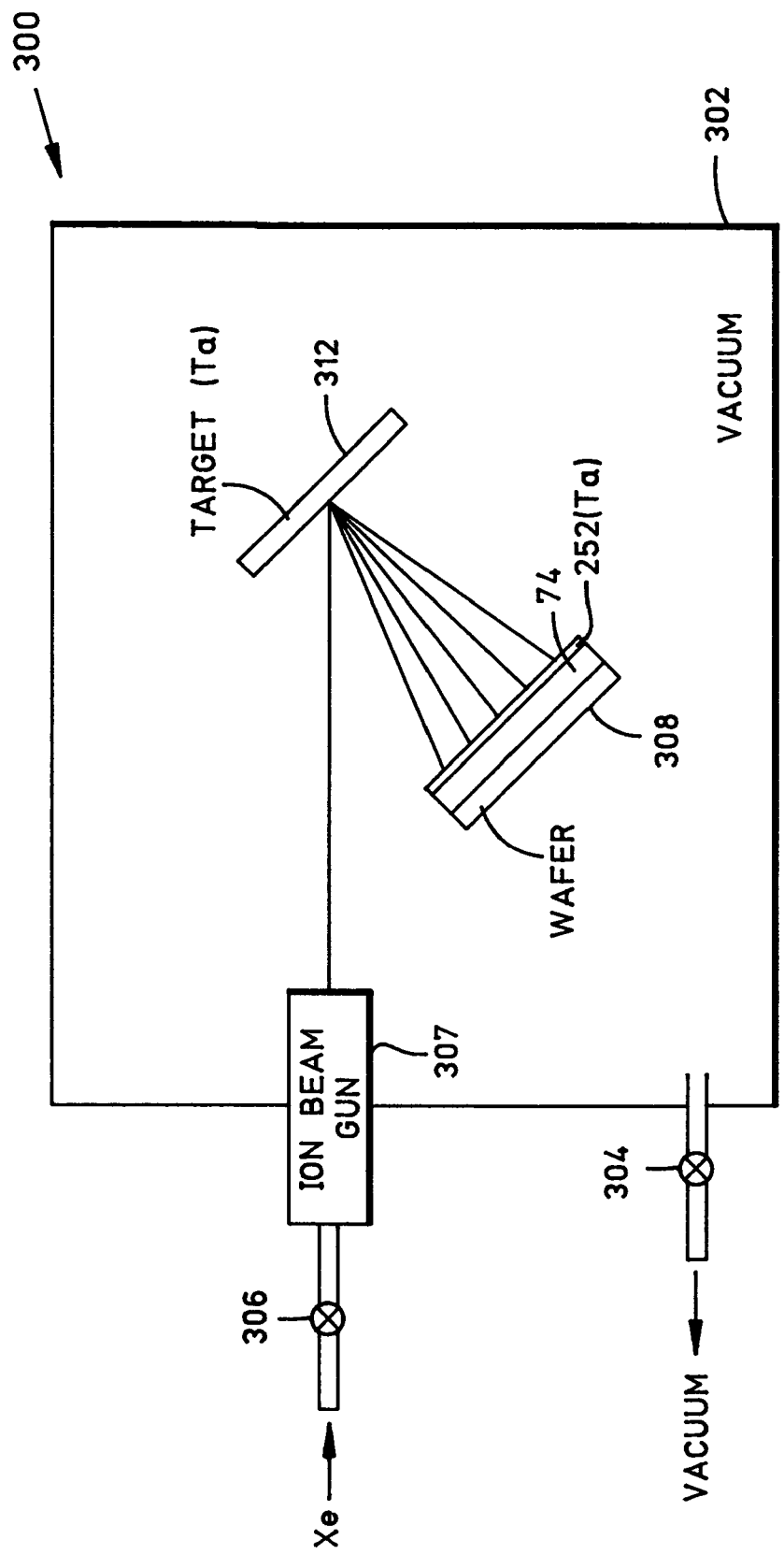
FIG. 14 is a schematic illustration of a sputtering chamber sputtering the first layer of the cap layer structure.
Figure 15:
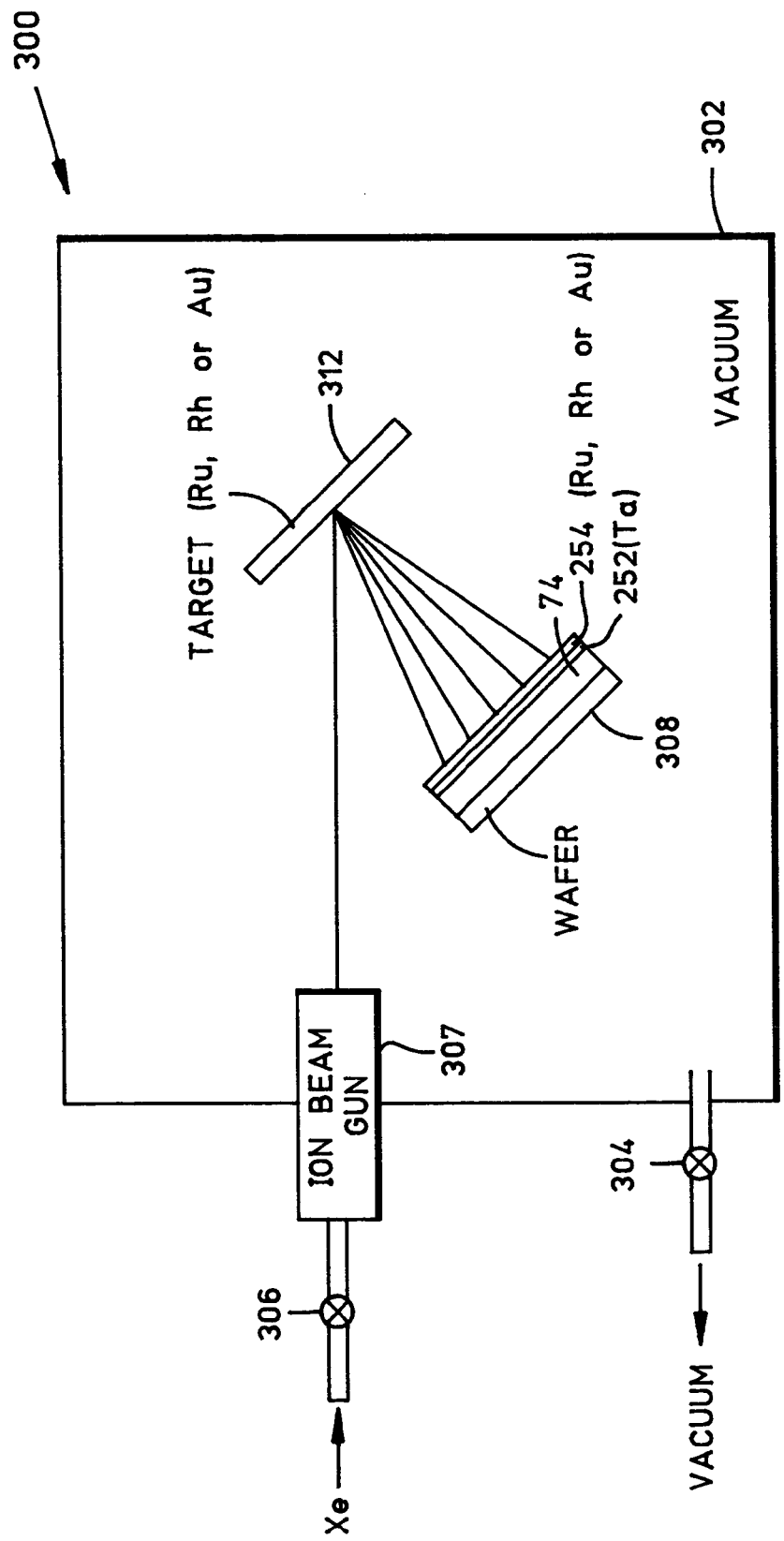
FIG. 15 is the same as FIG. 14 except the second layer of the cap layer structure is being sputtered.

The method of making the cap layer structure 250 in FIGS. 12 and 13 may be accomplished with a sputtering system 300 which is schematically illustrated in FIGS. 14 and 15. The sputtering system 300 includes a sputtering chamber 302 which has a valve controlled outlet 304 and a valve control inlet 306. The outlet 304 is for the purpose of drawing a vacuum in the chamber and the inlet 306 is for the purpose of introducing an inert gas, such as xenon (Xe), into an ion beam gun 307. Mounted within the chamber is a wafer 308 upon which layers of the read head, including the sensor 74, are formed. Opposite the wafer is a target 312 composed of the material to be sputter deposited on the wafer 310. The ion beam gun 307 may be mounted at one end of the chamber 302 for the purpose of directing a beam of ionized atoms onto the target 312. Within the ion beam gun high energy electrons collide with atoms, such as argon (Ar), krypton (Kr) or xenon (Xe) atoms, knocking out one of the electrons of each atom causing the atoms to be ionized with a positive charge. Electrons knocked out of the atoms can knock out additional electrons from other atoms which creates a plasma within the ion beam gun 314. Ionized atoms from the ion beam gun strike the target 312 which causes the material of the target to be sputtered and deposited on the wafer 310.

In FIG. 14 the CPP sensor 74 in FIGS. 12 or 13, except for the cap layer structure 250, is fabricated on the wafer 308 in the sputtering chamber 300. The first cap layer 252 of tantalum (Ta) is formed on the sensor by sputtering tantalum from a tantalum target 312. This sputtering is done while the sputtering chamber 300 has a vacuum. In FIG. 15 the vacuum in FIG. 14 is maintained (not broken) while the second layer 254 of the cap structure of ruthenium (Ru), rhodium (Rh) or gold (Au) is sputtered on the first layer 252. By maintaining the vacuum, oxygen ($O_2$) will not oxidize a top portion of the tantalum layer 252 thereby reducing the resistance of the tantalum layer to the current ($I_T$) through the sensor as discussed hereinabove.

Discussion

It should be understood that the pinned layer 202 may alternatively be an antiparallel (AP) pinned layer structure with first and second ferromagnetic layers, such as cobalt iron ($Co_{90}Fe_{10}$), separated by a thin (i.e. 8 Å) separation layer, such as ruthenium (Ru), which is fully described in commonly assigned U.S. Pat. No. 5,768,069. Still further, the AP pinned layer structure may be a soft pinned layer structure without a pinning layer. It should further be understood that while the ferromagnetic material of the pinned and free layers is preferably cobalt iron (CoFe) the invention can be practiced with other ferromagnetic materials, such as any cobalt based or nickel iron based materials.

It should be understood that the read head 72 may be employed in a tape drive (not shown) in lieu of the disk drive illustrated in FIGS. 1–5. With such a read head the surface facing the magnetic tape is referred to as a head surface instead of an air bearing surface (ABS).

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   a current perpendicular to the planes (CPP) sensor;
   the CPP sensor having a top cap layer structure;
   the cap layer structure being composed of a first layer of tantalum (Ta) and a second layer of ruthenium (Ru); and the first layer interfacing the second layer and being located between a spacer layer and the second layer.

2. A magnetic read head as claimed in claim 1 wherein the CPP sensor further comprises:
   a ferromagnetic pinned layer structure;
   a ferromagnetic free layer structure;
   the nonmagnetic spacer layer being located between the pinned layer and the free layer structure.

3. A magnetic read head as claimed in claim 2 further comprising:
   ferromagnetic first and second shield layers;
   the CPP sensor being located between the first and second shield layers; and
   the first and second shield layers serving as first and second leads for conducting a current through the CPP sensor in a direction perpendicular to major thin film planes of the CPP sensor.

4. A magnetic read head as claimed in claim 3 wherein the free layer structure is located between the spacer layer and the cap layer structure.

5. A magnetic read head as claimed in claim 3 wherein the pinned layer structure is located between the spacer layer and the cap layer structure.

6. A magnetic head assembly comprising:
   a write head;
   a read head adjacent the write head;
   the read head comprising:
      a current perpendicular to the planes (CPP) sensor;
      the CPP sensor having a top cap layer structure;
      the cap layer structure being composed of a first layer of tantalum (Ta) and a second layer of ruthenium (Ru); and the first layer interfacing the second layer and being located between a spacer layer and the second layer.

7. A magnetic head assembly as claimed in claim 6 wherein the CPP sensor further comprises:
   a ferromagnetic pinned layer structure;
   a ferromagnetic free layer structure;
   the nonmagnetic spacer layer being located between the pinned layer structure and the free layer structure.

8. A magnetic head assembly as claimed in claim 7 further comprising:
   ferromagnetic first and second shield layers;
   the CPP sensor being located between the first and second shield layers; and
   the first and second shield layers serving as first and second leads for conducting a current through the CPP sensor in a direction perpendicular to major thin film planes of the CPP sensor.

9. A magnetic disk drive comprising:
   at least one magnetic head assembly that has a head surface;
   the magnetic head assembly having a write head and a read head;
   the read head including:
      a current perpendicular to the planes (CPP) sensor;
      the CPP sensor having a top cap layer structure;
      the cap layer structure being composed of a first layer of tantalum (Ta) and a second layer of ruthenium (Ru); and the first layer interfacing the second layer and being located between a spacer layer and the second layer
   ferromagnetic first and second shield layers; and the CPP sensor being located between the first and second shield layers;
   a housing;
   a magnetic medium supported in the housing;
   a support mounted in the housing for supporting the magnetic head assembly with said head surface facing the magnetic medium so that the magnetic head assembly is in a transducing relationship with the magnetic medium;
   a motor for moving the magnetic medium; and
   a processor connected to the magnetic head assembly and to the motor for exchanging signals with the magnetic head assembly and for controlling movement of the magnetic medium.

10. A magnetic disk drive as claimed in claim 9 wherein the CPP sensor further comprises:
    a ferromagnetic pinned layer structure;
    a ferromagnetic free layer structure;
    the nonmagnetic spacer layer being located between the pinned layer structure and the free layer structure.

11. A magnetic read head comprising:
    a current perpendicular to the planes (CPP) sensor;
    the CPP sensor having a top cap layer structure which includes:
       a first layer of tantalum (Ta) only;
       a second layer of rhodium (Rh); and
       the first layer interfacing the second layer and being located between a spacer layer and the second layer.

12. A magnetic read head as claimed in claim 11 wherein the CPP sensor further comprises:
    a ferromagnetic pinned layer structure;
    a ferromagnetic free layer structure; and
    the spacer layer being located between the pinned layer structure and the free layer structure.

13. A magnetic read head as claimed in claim 12 further comprising:
    ferromagnetic first and second shield layers;
    the CPP sensor being located between the first and second shield layers; and
    the first and second shield layers serving as first and second leads for conducting a current through the CPP sensor in a direction perpendicular to major thin film planes of the CPP sensor.

14. A magnetic read head as claimed in claim 12 wherein the first layer also interfaces the free layer structure.

15. A magnetic read head as claimed in claim 12 wherein the first layer also interfaces the pinned layer structure.

* * * * *